United States Patent
Bitter et al.

(10) Patent No.: US 8,064,480 B2
(45) Date of Patent: Nov. 22, 2011

(54) METHOD AND APPARATUS FOR PROVIDING INTEROPERABILITY BETWEEN A FIRST PROTOCOL AND A SECOND PROTOCOL

(75) Inventors: Richard J. Bitter, Schaumburg, IL (US); Jamillah G. Davis, Hoffman Estates, IL (US); James E. Eastwood, Bellingham, WA (US); Leslie G. Gustafson, Oakwood Hills, IL (US); Dennis R. Newkirk, Lake Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 178 days.

(21) Appl. No.: 12/494,774

(22) Filed: Jun. 30, 2009

(65) Prior Publication Data

US 2010/0329280 A1 Dec. 30, 2010

(51) Int. Cl.
*H04J 3/22* (2006.01)
(52) U.S. Cl. .................. 370/466; 370/338; 370/474
(58) Field of Classification Search .............. 370/328, 370/338, 389, 465, 466, 474
See application file for complete search history.

(56) References Cited

U.S. PATENT DOCUMENTS

| | | | |
|---|---|---|---|
| 7,782,848 B2 * | 8/2010 | Kalavade et al. | 370/389 |
| 2003/0147419 A1 * | 8/2003 | Vimpari et al. | 370/466 |
| 2008/0037478 A1 * | 2/2008 | Na et al. | 370/338 |
| 2008/0069148 A1 * | 3/2008 | Wu | 370/498 |

FOREIGN PATENT DOCUMENTS

WO 03007489 A2 1/2003

OTHER PUBLICATIONS

PCT/US2010/037992—International Search Report with Written Opinion mailed Sep. 6, 2010—12 pages.
Digital Cellular Telecommunications System (Phase 2+) (GSM); Universal Mobile Telecommunications System (UMTS); Interworking between the Public Land Mob ile Network (PLMN) supporting Packet Based services and Packet Data Networks (PDN)—(3GPP TS 29.061 version 3.7.0 Release 1999)—ETSI TS 129 061 V3.7.0, 52 PAGES—Sep. 2001—XP-002244647—pp. 24, 27.

* cited by examiner

*Primary Examiner* — Ricky Ngo
*Assistant Examiner* — Kan Yuen
(74) *Attorney, Agent, or Firm* — Barbara R. Doutre

(57) ABSTRACT

The application discloses a method and apparatus for providing interoperability for a mobile subscriber unit (MSU), employing a first protocol e.g., SCEP, with a packet-data subsystem operating at a second protocol e.g., SNDCP. The method includes determining that the first protocol employed by the MSU is different from the second protocol operated by the packet data subsystem. The method then includes creating a context information for the MSU when the determined first protocol is different from the second protocol. Further, the method includes determining a header associated with the second protocol based on the created context information and then receiving at least one data packet associated with the first protocol from the MSU. The method then encapsulates the at least one data packet with the determined header associated with the second protocol. The method then transmits the at least one encapsulated data packet to the communication network through a context manager.

17 Claims, 3 Drawing Sheets

METHOD AND APPARATUS FOR PROVIDING INTEROPERABILITY BETWEEN A FIRST PROTOCOL AND A SECOND PROTOCOL

FIELD OF THE DISCLOSURE

The present disclosure relates generally to a mobile subscriber unit (MSU) and more particularly to a method and apparatus for providing interoperability for the MSU, employing a first protocol, with a packet data subsystem operating at a second protocol.

BACKGROUND

As the public safety market continues to require increased functionality of two-way radio, association of public safety communications officials (APCO) through project 25 (P25) encourages participation of equipment suppliers and organizations to find solutions that meet the needs of the public safety market. In general the APCO standard specifies two approaches for providing packet data internet protocol (IP) bearer service on conventional channels. The first approach employs simple common air interface Encapsulation protocol (SCEP), and the second approach employs sub-network dependent convergence protocol (SNDCP).

In the existing conventional systems, the subscriber units employing the SCEP protocol can communicate only with the infrastructure system operating at the SCEP protocol. Similarly, the subscriber units employing SNDCP protocol can communicate only with the infrastructure system operating at the SNDCP protocol. However, migrating the subscriber unit employing the SCEP protocol to the system having SNDCP protocol currently requires replacement of the system's infrastructure as well as all of its subscriber units. This is costly and undesirable.

In the existing technology, the challenge is that the SCEP and SNDCP based subscribers cannot operate on the same channel. Other systems may face similar challenges when attempted to handle multiple protocols on the same channel.

Accordingly, there exists a need for providing interoperability between two different protocols.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Before describing in detail embodiments that are in accordance with the present invention, it should be observed that the embodiments reside primarily in combinations of method, steps and components related to providing interoperability for a mobile subscriber unit (MSU), employing a first protocol e.g., SCEP, with a packet data subsystem operating at a second protocol e.g., SNDCP. The method includes determining that the first protocol employed by the MSU is different from the second protocol operated by the packet-data subsystem. The method then includes creating a context information for the MSU when the determined first protocol is different from the second protocol. Further, the method includes determining a header associated with the second protocol based on the created context information and then receiving at least one data packet associated with the first protocol from the MSU. The method then encapsulates the at least one data packet with the determined header associated with the second protocol. Further, the method transmits the at least one encapsulated data packet to the communication network through a context manager.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
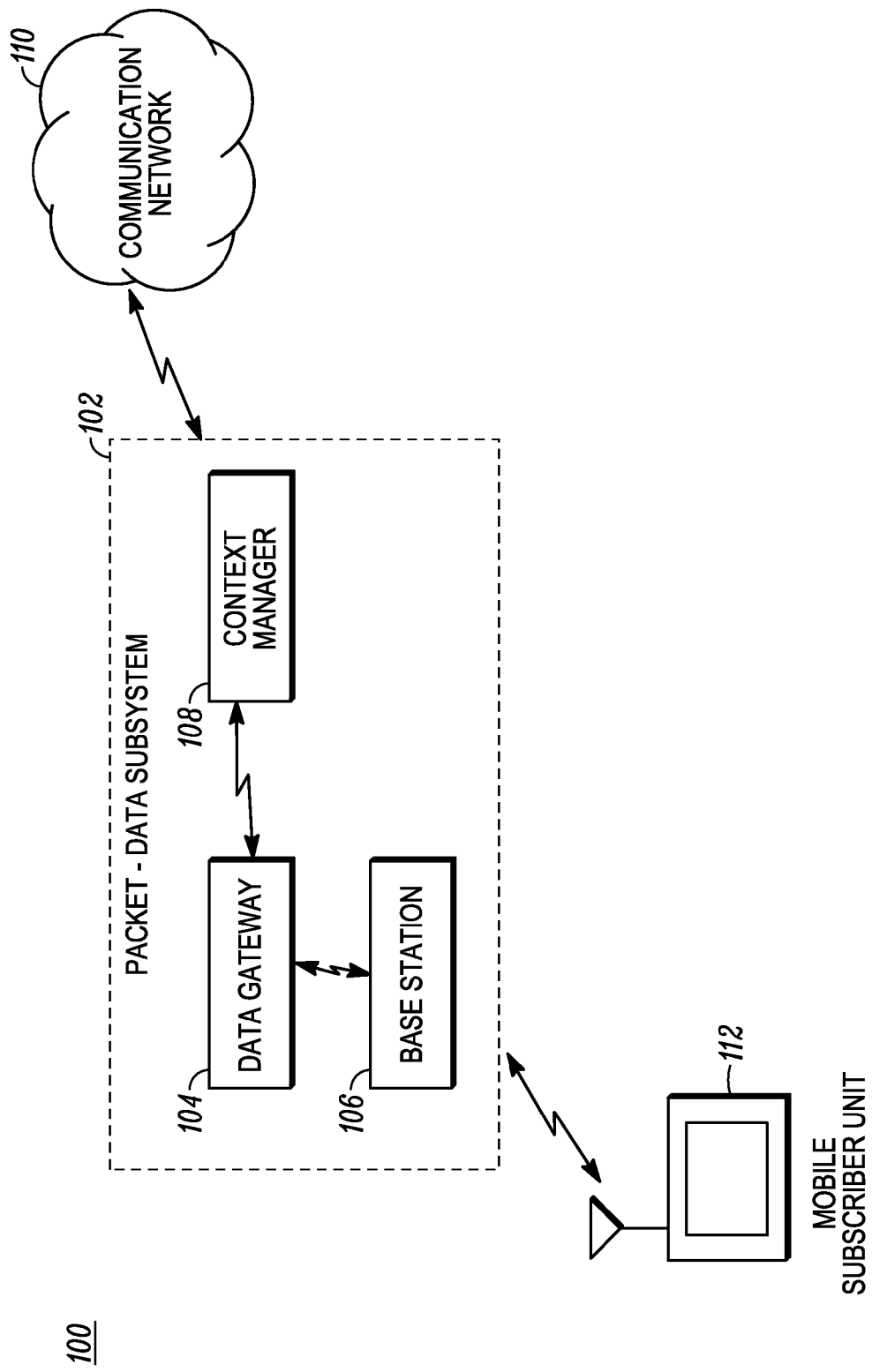
FIG. 1 is a communication system in accordance with some embodiments.

FIG. 1 illustrates a communication system 100 in accordance with some embodiments. The communication system 100 includes a packet-data subsystem 102, a communication network 110 and a mobile subscriber unit (MSU) 112.

In accordance with the embodiment, the MSU 112 may be a device, associated with a subscriber that employs a protocol for communicating with the communication network 110 via the packet-data subsystem 102. The protocol may be any type of communication protocol that employs common air interface operating procedures, e.g., simple common air interface encapsulation protocol (SCEP). It should be noted that the protocol employed by the MSU 112 may also be referred as a first protocol in the below description.

In accordance with the embodiment, the MSU 112 is configured to operate according to one of a number of different 2G, 3G and 4G wireless communication technologies. These include Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Worldwide Interoperability for Microwave Access (WiMax), Long-Term Evolution (LTE) and other communication technologies. The MSU 112 may be a wireless device, a mobile station, user equipment, an APCO 25 radio, or any similar device that can transmit and receive signals employing a first protocol via the packet-data subsystem 102.

In accordance with the embodiment, the packet-data subsystem 102 is an infrastructure system that includes a data gateway (DG) 104, a base station 106, and a context manager 108. The packet-data subsystem 102 may operate at a protocol that is different from the first protocol employed by the MSU 112. It should be noted that the protocol used by the packet-data subsystem 102 may be referred as a second protocol in the below description.

In accordance with the embodiment, the DG 104 is a functional entity that is responsible for supporting functions such as IP address assignment, authentication, traffic security, and so on. The DG 104 may include a data concentrator, multi-protocol data manager or a packet data gateway. Since the DG 104 is a part of the packet-data subsystem 102, the DG 104 may also operate on the second protocol, for example, a sub network dependent convergence protocol (SNDCP). The DG 104 may also proxy the data packets associated with the first protocol, that are received from the MSU 112, by encapsulating a header associated with the second protocol employed by the packet-data subsystem 102. The process of encapsulating the header may be referred as SNDCP proxying, in which the SNDCP header is added to the data packets associated with the first protocol. The SNDCP proxying manages the SNDCP state variables and timers so that the data packets and the MSU 112 appears to the communication network 110 as being associated with the second protocol, for example SNDCP.

Further, in accordance with the embodiment, the base station 106 is an entity that facilitates wireless communication between two communication devices or a network. The base station 106 is communicatively coupled between the MSU 112 and the DG 104, for facilitating wireless communication between the MSU 112 and the DG 104. The base station 106 may be referred as a radio base station, node B (in 3G networks), base transceiver station, or cell site.

In accordance with the embodiment, the context manager 108, coupled between the DG 104 and the communication network 110, is responsible for networking between the DG 104 and the communication network 110. More particularly, the context manager 108 may be used for routing the data packets between the DG 104 and the communication network 110. In accordance with the embodiment, the context manager 108 may be a gateway general packet radio service support node (GGSN) or other.

Operationally, the MSU 112 sends a data registration request message to the DG 104 via the base station 106. The data registration request message notifies the base station 106 that a data registration process is in progress. Upon receiving the data registration request message, the DG 104 determines whether the protocol, for example, the first protocol employed by the MSU 112 is different from the protocol, e.g. second protocol, operated by the packet-data subsystem 102. In another embodiment, the DG 104 determines that the first protocol is different from the second protocol based on the information manually entered by an operator.

If the first protocol employed by the MSU 112 is the same as the second protocol operated by the packet-data subsystem 102, the DG 104 sends a registration response message to the MSU 112 via the base station 106. The registration response message indicates the MSU 112 that the MSU 112 can send a data packet to the DG 104 and the DG 104 is ready to receive the data packet. Upon receiving the registration response message, the MSU 112 sends the data packet to the DG 104. The DG 104 then forwards the data packet without proxying to the context manager 108 that further transmits the data packet to the communication network 110. The proxying of the data packet is a process of adding a header associated with the second protocol to the data packet, associated with the first protocol, received from the MSU 112.

On the other hand, if the DG 104 determines that the first protocol employed by the MSU 112 is different from the second protocol operated by the packet-data subsystem 102, the DG 104 then sends a context request message to the context manager 108. The context request message notifies the context manager 108 that the MSU 112 desires to establish a communication session. The context request message includes information such as SNDCP layer timers, IP address requests, protocol specific capabilities such as compression, and manufacturer specific capabilities. The context manager 108, on receiving the context request message, generates a data context and sends a context response message including the data context to the DG 104.

In accordance with the embodiment, the DG 104 creates context information based on the received context response message. The context information indicates the parameters for the communication session, for example, system acceptable timer values, IP address assignment, protocol or manufacturer capabilities that are enabled by the packet-data subsystem 102 and are to be utilized by the MSU 112.

Further, the DG 104 determines a header associated with the second protocol based on context information determined by the DG 104. For example, the DG 104 determines the header associated with the SNDCP based on the context information created by the DG 104.

Upon determining the header associated with the second protocol e.g., SNDCP header, the DG 104 sends the registration response message to the MSU 112 via the base station 106. In response to sending a registration response message to the MSU 112, the DG 104 receives the data packet, associated with the first protocol. For example, the DG 104 receives the data packet associated with the SCEP from the MSU 112.

Further, the DG 104 encapsulates the received data packet associated with the first protocol with the header determined by the DG 104. In accordance with the embodiment, the process of encapsulating the data packet with the header may be referred as SNDCP proxy. The DG 104 proxies the received data packet by adding the SNDCP header, to the SCEP based data packet, that is determined based on the context information. More particularly, the DG 104 manages the SNDCP state variables and associated timers, e g., SNDCP ready timers and SNDCP standby timers.

Upon encapsulating the data packet with the determined header, the DG 104 transmits the encapsulated data packet to the communication network 110 via the context manager 108.

Thus, data packet associated with the first protocol is encapsulated with the header associated with the second protocol. So, when the communication network 110 receives the data packet, the communication network considers the data packet to be associated with the second protocol, for example, SNDCP. Therefore, a seamless interoperability is provided between the MSU 112 and the communication network 110 irrespective of the protocol employed by the MSU 112.

Figure 2:
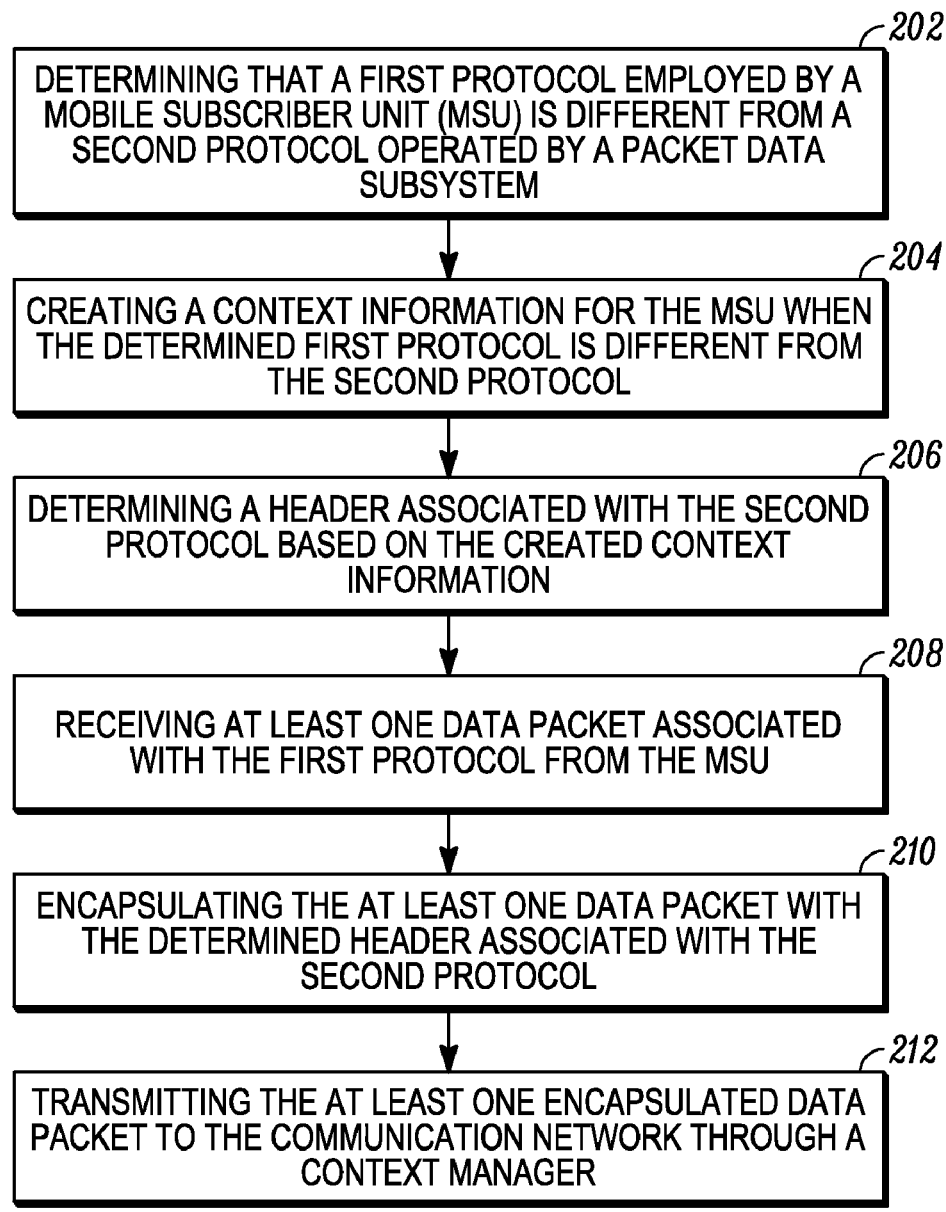
FIG. 2 is a flowchart representing a method for providing interoperability for a mobile subscriber unit (MSU) employing simple common air interface protocol (SCEP) with a packet-data subsystem operating at the sub network dependent convergence protocol (SNDCP) in accordance with some embodiments.

Referring to FIG. 2, the method 200 begins with a step of determining 202 that the first protocol employed by the MSU 112 is different from the second protocol operated by the packet-data subsystem 102. The DG 104 determines that the first protocol is different from the second protocol based on a registration request message received from the MSU 112. In another embodiment, the DG 104 determines that the protocols differ based on the information manually entered by an operator.

Further, upon determining that the first protocol is different from the second protocol, the method 200 moves to a step of creating 204 a context information for the MSU 112. In accordance with an embodiment, creating the context information comprises sending a context request message, having at least one parameter associated with the MSU 112, to the context manager 108. The context request message includes information such as SNDCP layer timers, IP address requests, protocol specific capabilities such as compression, and manufacturer specific capabilities. In response to the sending the context request message, the DG 104 receives a context response message having a data context. The data context in the context response message includes the updated information about SNDCP layer timers.

Upon receiving the context response message, the DG 104 creates the context information based on the received context response message having the data context. The context information includes system acceptable timer values, IP address assignment, protocol or manufacturer capabilities that are enabled by the packet data subsystem 102 to be utilized by the MSU. In accordance with the embodiment, the context information manages state and timer values of the second protocol, e.g., SNDCP in order to relate the operation of the second protocol to the first protocol, e.g., SCEP.

The method 200 then moves to a step of determining 206 a header associated with the second protocol based on the created context information. The DG 104 may determine 206 the header by obtaining at least one address associated with the second protocol from a plurality of addresses included in the context information.

Upon determining the header at 206, the method 200 then moves to a step of receiving 208 at least one data packet associated with the first protocol from the MSU 112. In accordance with the embodiment, the at least one data packet associated with the first protocol is received in response to sending a registration response message to the MSU 112. The registration response message indicates that the DG 104 is ready to receive the data packet.

The method 200 then moves to a step of encapsulating 210 the at least one data packet with the determined header that is associated with the second protocol.

Encapsulation is performed by obtaining the data packet associated with the first protocol from the MSU 112. Then, the header associated with the second protocol is inserted to the obtained data packet associated with the first protocol. Further, an internet protocol (IP) routing address is attached to the header inserted to the at least one data packet.

In accordance with the embodiment, the process of encapsulating the data packet with the header may be referred as SNDCP proxy. The DG 104 proxies the data packet by adding the SNDCP header to the SCEP based data packet. Further, the DG 104 manages the SNDCP state variables and associated timers, e.g., SNDCP ready timers and SNDCP standby timers. By proxying the data packet associated with the first protocol with the header associated with the second protocol, the data packet appears to the communication network 110 as being associated with the second protocol.

Further, the method 200 moves to a step of transmitting 212 the at least one encapsulated data packet to the communication network 110 through context manager 108.

Thus, the DG 104 in the packet data subsystem 102 attaches the SNDCP header to the data packets received from the MSU 112 associated with the SCEP so that all the data packets appear to the communication network 110 as being associated with the SNDCP.

In accordance with the embodiment, the packet-data subsystem 102 may receive the data packets from the communication network 110 that are associated with the first protocol and are encapsulated with the header associated with the second protocol. In such a scenario, the DG 104 de-capsulates header associated with the second protocol from the data packet that is associated with the first protocol. Further, the DG 104 transmits the de-capsulated data packet to the MSU 112 employing the first protocol. Thus, MSU 112 receives the data packet associated with the first protocol and at the same time, the data packet appears to the communication network 110 as being associated with the second protocol. So, a seamless interoperability is provided between the MSU 112 and the communication network 110 irrespective of the protocol employed by the MSU 112.

Figure 3:
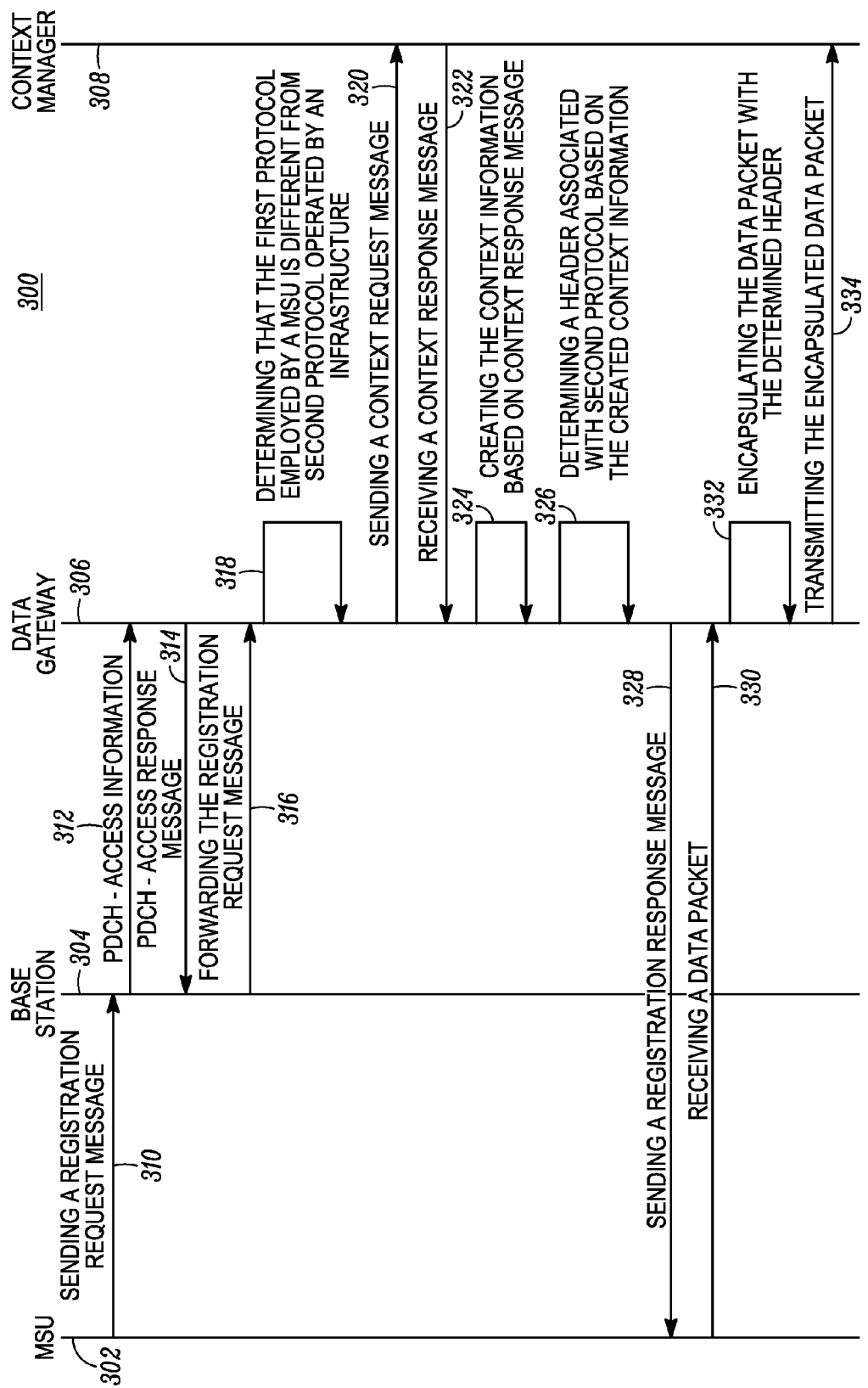
FIG. 3 is a signal flow diagram in accordance with some embodiments. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 3 is a signal flow diagram 300 of a method for providing interoperability for a mobile subscriber unit (MSU), employing a first protocol, with a packet-data subsystem operating at a second protocol. In accordance with an embodiment, the first protocol is a simple common air interface encapsulation protocol (SCEP) and the second protocol is a sub network dependent convergence protocol (SNDCP).

The signal flow diagram 300 begins with a step of MSU 112 sending 310 a registration request message to a base station 304. The registration request message notifies the base station 304 that a data registration process in is progress. In response to receiving the registration request message, the base station 304 transmits 312 a packet data channel (PDCH)-access information message to a data gateway (DG) 306. In accordance with an embodiment, the PDCH-access information message includes information that notifies the DG 306 that a data registration request process is in progress. Upon receiving the PDCH-access information message, the DG 306 transmits 314 a PDCH-access response message to the base station 304. The PDCH-access response message notifies the base station 304 that the DG 306 is ready to accept the registration request message.

The signal flow 300 then moves to a step of forwarding 316, by the base station 304, the registration request message received from the MSU 302 to the DG 306. In accordance with the embodiment, the base station 304 may send an acknowledgment message to the MSU 302, after forwarding the registration request message to the DG 306, to confirm that the DG 306 has received the registration request message.

Upon receiving the registration request message from the base station 304, the DG 306 determines 318 that whether the first protocol employed by the MSU 302 is different from the second protocol operated by the packet-data subsystem 102. If the first protocol is different from the second protocol, the DG 306 sends 320 a context request message to the context manager 308. The context request message includes information such as SNDCP layer timers, IP address requests, protocol specific capabilities such as compression, and manufacturer specific capabilities. In response to sending 320 a context request message to the context manager 308, the DG 306 receives 322 a context response message from the context manager 308. The context response message includes data context that indicates updated SNDCP layer timers included in the context request message.

The signal flow diagram 300 then moves to a step of creating 324, by a DG 306, the context information based on the context response message received 322 from the context manager 308. The context information includes system acceptable timer values, IP address assignment, protocol or manufacturer capabilities that are enabled by the packet-data subsystem 102 to be utilized by the MSU 302. In accordance with an embodiment, the DG 306 creates 324 the context information on behalf of the MSU 302.

Upon creating 324 the context information, the DG 306 determines 326 a header associated with the second protocol based on the created 324 context information. In accordance with the embodiment, the DG 306 determines 326 header by obtaining at least one address associated with the second protocol from a plurality of addresses included in the context information.

The signal flow diagram 300 then moves to a step of sending 328 a registration response message by the DG 306 to the MSU 302 via the base station 304. The registration response message indicates to the MSU 302 that the DG 306 is ready to receive the data packet. In response to the registration response message being received by the MSU 302, the DG 306 receives 330 the data packet associated with the first protocol from the MSU 302.

Upon receiving 330 the data packet from the MSU 302, the signal flow diagram 300 continues to a step of encapsulating 332 the data packet with the header determined 326 by the DG 306. In accordance with the embodiment, the step of encapsulation 332 is performed by obtaining the data packet associated with the first protocol received from the MSU 302. Next, the header associated with the second protocol is inserted to the obtained data packet associated with the first protocol. Further, an internet protocol (IP) routing address is attached to the header inserted to the at least one data packet.

In accordance with the embodiment, the process of encapsulating the data packet with the header may be referred as SNDCP proxy. The DG 306 proxies the data packet by adding the SNDCP header to the SCEP based data packet received from the MSU 302. Further, the DG 104 manages the SNDCP state variables and associated timers, e g., SNDCP ready timers and SNDCP standby timers.

After encapsulating 332 the data packet associated with the first protocol with the determined header that is associated with the second protocol, the signal flow diagram 300 then moves to step of transmitting 332 the encapsulated data packet to the context manager 308. In accordance with the embodiment, the DG 306 transmits 334 the encapsulated data packet by tunneling the encapsulated data packet as a tunneled-packet data unit (T_PDU) message. The T_PDU message is global system of mobile (GSM) standard message defined in gateway general packet radio service support node (GGSN) tunneling protocol.

The context manager 308 further transmits the encapsulated data packet to the communication network 110. Thus, the SNDCP proxy in the DG 306 makes the entire data packets appear to the communications network 110 as SNDCP based data packets. The SNDCP proxy provides SNDCP signaling necessary to allow SNDCP based communication network 110 to provide seamless interoperability between the communication network 110 and the MSU 302, irrespective of the protocol employed by the MSU 302.

In accordance with the embodiment, the packet-data subsystem 102 may receive the data packets from the communication network 110 that are associated with the first protocol and are encapsulated with the header associated with the second protocol. In such a scenario, the DG 306 de-capsulates header associated with the second protocol from the data packet that is associated with the first protocol. Further, the DG 306 transmits the de-capsulated data packet to the MSU 302 employing the first protocol. Thus, MSU 302 receives the data packet associated with the first protocol and at the same time, the data packet appears to the communication network 110 as being associated with the second protocol, thereby providing a seamless interoperability is provided between the MSU 302 and the communication network 110 irrespective of the protocol employed by the MSU 302.

The invention provides multiple protocol support without multiple infrastructure devices. Further, the invention also provides simultaneous support of multiple protocols on a single channel and allows for slow migration of units being upgraded from one protocol to another.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers (or "controlling devices") such as microcontroller, customized controllers and unique stored program instructions (including both software and firmware) that control the one or more controllers to implement, in conjunction with certain non-controller circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A method for providing interoperability for a mobile subscriber unit (MSU), employing a first protocol, with a packet-data subsystem operating at a second protocol in a communication network, the method comprising:
   determining that the first protocol employed by the MSU is different from the second protocol operated by the packet-data subsystem;
   creating a context information for the MSU when the determined first protocol is different from the second protocol;
   determining a header associated with the second protocol based on the created context information;
   receiving at least one data packet associated with the first protocol from the MSU in response to the determination of the header associated with the second protocol;
   encapsulating the at least one data packet with the determined header associated with the second protocol; and
   transmitting the at least one encapsulated data packet to the communication network through a context manager;
   wherein the first protocol includes at least one protocol that is based on common air interface (CAI) and the second protocol includes sub network dependent convergence protocol (SNDCP); and
   wherein the CAI comprises a simple common air interface encapsulation protocol (SCEP).

2. The method of claim 1, wherein determining that the first protocol is different from the second protocol based on a registration request message received from the MSU.

3. The method of claim 1, wherein determining that the first protocol is different from the second protocol based on information manually entered by an operator.

4. The method of claim 1, wherein creating the context information comprises:
   sending a context request message, having at least one parameter associated with the MSU, to the context manager;
   receiving a context response message having a data context in response to the sent context request message; and
   creating the context information based on the received context response message having the data context.

5. The method of claim 1, wherein determining the header comprises: obtaining at least one address associated with the second protocol from a plurality of addresses included in the created context information; determining the header based on the obtained at least one address.

6. The method of claim 1, wherein the at least one data packet associated with the first protocol is received in response to sending a registration response message to the MSU.

7. The method of claim 1, wherein encapsulating the at least one data packet comprises:
   obtaining the at least one data packet associated with the first protocol received from the MSU;
   inserting the header associated with the second protocol to the obtained at least one data packet associated with the first protocol; and
   attaching an internet protocol (IP) routing address to the header inserted to the at least one data packet.

8. The method of claim 1, wherein determining the header comprises determining a single header, and the at least one data packet comprises a plurality of data packets.

9. An apparatus for providing interoperability for a mobile subscriber unit (MSU), employing a first protocol, with a packet-data subsystem operating at a second protocol in a communication network, the apparatus comprising:
   a data gateway (DG) for determining that the first protocol employed by the MSU is different from the second protocol operated by the packet-data subsystem;
   the DG for creating a context information for the MSU when the determined first protocol is different from the second protocol, and determining a header associated with the second protocol based on the created context information;
   a base station coupled to the DG for receiving at least one data packet associated with the first protocol from the MSU in response to the determination of the header associated with the second protocol;
   the DG for encapsulating the at least one data packet with the determined header associated with the second protocol and
   transmitting the at least one encapsulated data packet to the communication network through a context manager;
   wherein the first protocol includes at least one protocol that is based on common air interface (CAI) and the second protocol includes sub network dependent convergence protocol (SNDCP); and
   wherein the CAI comprises a simple common air interface encapsulation protocol (SCEP).

10. The apparatus of claim 9, wherein the DG determines that the first protocol is different from the second protocol based on a registration request message received from the MSU.

11. The apparatus of claim 9, wherein the DG determines that the first protocol is different from the second protocol based on information manually entered by an operator.

12. The apparatus of claim 9, wherein the DG creates the context information by sending a context request message, having at least one parameter associated with the MSU, to the context manager, receiving a context response message having a data context in response to the sent context request message, and creating the context information based on the received context response message having the data context.

13. The apparatus of claim 9, wherein the DG determines the header by obtaining at least one address associated with the second protocol from a plurality of addresses included in the created context information, and determining the header based on the obtained at least one address.

14. The apparatus of claim 9, wherein the base station receives the at least one data packet associated with the first protocol in response to sending a registration response message to the MSU.

15. The apparatus of claim 9, wherein the DG encapsulates the at least one data packet by obtaining the at least data packet associated with the first protocol received from the MSU, inserting the header associated with the second protocol to the obtained at least one data packet associated with the first protocol, and attaching an internet protocol (IP) routing address to the header inserted to the at least one data packet.

16. The apparatus of claim 9, wherein the packet-data subsystem includes at least one of a base station, data gateway (DG) and a context manager.

17. The apparatus of claim 9, wherein the determined header comprises a determined single header and the at least one data packet comprise a plurality of data packets.

* * * * *